(12) United States Patent
Fischel

(10) Patent No.: US 10,553,368 B2
(45) Date of Patent: Feb. 4, 2020

(54) GALVANIC PELLICLE REMOVABLE ATTACHMENT TOOL

(71) Applicant: Halbert P. Fischel, Las Vegas, NV (US)

(72) Inventor: Halbert P. Fischel, Las Vegas, NV (US)

(73) Assignee: Global Energy Science, LLC, Santa Barbara, CA (US)

( * ) Notice: Subject to any disclaimer, the term of this patent is extended or adjusted under 35 U.S.C. 154(b) by 141 days.

(21) Appl. No.: 15/446,276

(22) Filed: Mar. 1, 2017

(65) Prior Publication Data

US 2017/0173728 A1 Jun. 22, 2017

Related U.S. Application Data

(60) Continuation-in-part of application No. 15/069,998, filed on Mar. 15, 2016, now Pat. No. 9,991,059, (Continued)

(51) Int. Cl.
| | |
|---|---|
| *B23K 20/02* | (2006.01) |
| *B23D 1/00* | (2006.01) |

(Continued)

(52) U.S. Cl.
CPC ......... *H01G 11/24* (2013.01); *B23K 1/0016* (2013.01); *B23K 20/023* (2013.01); *H01G 11/02* (2013.01);
(Continued)

(58) Field of Classification Search
CPC ....... H01M 4/02–049; H01M 4/24–30; H01M 4/62; H01M 4/624; H01M 4/64–80;
(Continued)

(56) References Cited

U.S. PATENT DOCUMENTS

| 3,490,952 A | 1/1970 | Balaguer |
| 3,930,094 A | 12/1975 | Sampson et al. |

(Continued)

FOREIGN PATENT DOCUMENTS

| CN | 102306800 A | 1/2012 |
| JP | 2015524991 A | 8/2015 |
| KR | 20140048197 A | 4/2014 |

OTHER PUBLICATIONS

International Search Report for PCT/US2018/019628 dated Jun. 11, 2018.

(Continued)

*Primary Examiner* — Jonathan G Leong
*Assistant Examiner* — Jacob Buchanan
(74) *Attorney, Agent, or Firm* — Bachman & LaPointe, P.C.

(57) ABSTRACT

A tool (10) includes a base (12) made of contact and projection woven, metallic, compression screens (16, 18) secured to each other. A plurality of linear projections (30) extend away from the base (12). A shortest distance between adjacent linear projections (30) may be between about 20 μm and about 20 mm. The tool (10) is forced upon an uncompressed galvanic pellicle (52) so that the projections (30) compress and bond connected areas (56) of the pellicle (52) to a conductive surface (54) to form an electrode (50).

10 Claims, 4 Drawing Sheets

Related U.S. Application Data which is a division of application No. 14/717,139, filed on May 20, 2015, now Pat. No. 9,337,474.

(60) Provisional application No. 62/086,836, filed on Dec. 3, 2014.

(51) Int. Cl.

| | | |
|---|---|---|
| H01G 11/24 | (2013.01) | |
| H01M 4/133 | (2010.01) | |
| H01M 4/66 | (2006.01) | |
| H01M 4/96 | (2006.01) | |
| H01M 4/86 | (2006.01) | |
| H01M 2/16 | (2006.01) | |
| H01G 11/02 | (2013.01) | |
| H01G 11/04 | (2013.01) | |
| H01G 11/28 | (2013.01) | |
| H01G 11/32 | (2013.01) | |
| H01G 11/36 | (2013.01) | |
| H01G 11/70 | (2013.01) | |
| H01G 11/52 | (2013.01) | |
| H01G 11/26 | (2013.01) | |
| H01G 11/40 | (2013.01) | |
| H01G 11/46 | (2013.01) | |
| H01M 10/0525 | (2010.01) | |
| B23K 1/00 | (2006.01) | |
| H01M 4/02 | (2006.01) | |
| B23K 101/38 | (2006.01) | |

(52) U.S. Cl.
CPC .............. *H01G 11/04* (2013.01); *H01G 11/26* (2013.01); *H01G 11/28* (2013.01); *H01G 11/32* (2013.01); *H01G 11/36* (2013.01); *H01G 11/40* (2013.01); *H01G 11/46* (2013.01); *H01G 11/52* (2013.01); *H01G 11/70* (2013.01); *H01M 2/1653* (2013.01); *H01M 2/1686* (2013.01); *H01M 4/133* (2013.01); *H01M 4/661* (2013.01); *H01M 4/663* (2013.01); *H01M 4/8626* (2013.01); *H01M 4/96* (2013.01); *H01M 10/0525* (2013.01); *B23K 2101/38* (2018.08); *H01M 2004/021* (2013.01); *Y02E 60/13* (2013.01)

(58) Field of Classification Search
CPC .... H01M 4/86–8642; H01M 4/88–928; B23D 1/00–16; B23K 20/00–04; H01G 11/22–44
See application file for complete search history.

(56) References Cited

U.S. PATENT DOCUMENTS

| | | | |
|---|---|---|---|
| 4,366,051 A | 12/1982 | Fischel | |
| 4,386,987 A | 6/1983 | Covitch et al. | |
| 5,034,135 A | 7/1991 | Fischel | |
| 5,234,778 A | 8/1993 | Wright | |
| 5,376,263 A | 12/1994 | Fischel | |
| 5,476,588 A * | 12/1995 | Nagaoka | B01D 29/012 |
| | | | 210/499 |
| 5,660,941 A * | 8/1997 | Farooque | H01M 8/025 |
| | | | 429/425 |
| 5,955,215 A | 9/1999 | Kurzweil et al. | |
| 7,521,147 B2 | 4/2009 | Marsacq et al. | |
| 7,955,535 B2 | 6/2011 | Liang et al. | |
| 7,964,301 B2 | 6/2011 | Fischel et al. | |
| 7,971,489 B2 | 7/2011 | Pushparaj et al. | |
| 7,972,747 B2 | 7/2011 | Fischel | |
| 8,017,261 B2 | 9/2011 | Halbert | |
| 8,021,747 B2 | 9/2011 | Yi et al. | |
| 8,124,296 B1 | 2/2012 | Fischel | |
| 8,147,767 B2 | 4/2012 | Fischel | |
| 8,158,277 B1 | 4/2012 | Fischel | |
| 8,173,217 B2 | 5/2012 | Shin et al. | |
| 8,187,560 B2 | 5/2012 | Fischel | |
| 8,187,737 B2 | 5/2012 | Fischel | |
| 8,213,157 B2 | 7/2012 | Wei et al. | |
| 8,283,062 B2 | 10/2012 | Fischel | |
| 8,283,275 B2 | 10/2012 | Heo et al. | |
| 8,333,810 B1 | 12/2012 | Meyyappan | |
| 8,394,518 B2 | 3/2013 | Fischel et al. | |
| 8,415,012 B2 | 4/2013 | Zheng et al. | |
| 8,415,072 B2 | 4/2013 | Oh et al. | |
| 8,703,355 B2 | 4/2014 | Zhang et al. | |
| 8,911,893 B2 | 12/2014 | Suppes | |
| 8,951,697 B2 | 2/2015 | Zhang et al. | |
| 9,337,474 B1 | 5/2016 | Fischel | |
| 9,379,368 B2 | 6/2016 | Roumi | |
| 9,508,976 B2 | 11/2016 | Herle | |
| 9,698,396 B2 | 7/2017 | Lee et al. | |
| 2002/0022570 A1 * | 2/2002 | Reynolds, III | C04B 35/536 |
| | | | 502/101 |
| 2002/0180094 A1 | 12/2002 | Gough et al. | |
| 2004/0058249 A1 | 3/2004 | Cai et al. | |
| 2005/0104243 A1 | 5/2005 | Mercuri et al. | |
| 2006/0134500 A1 | 6/2006 | Marsacq et al. | |
| 2006/0172134 A1 | 8/2006 | Ro et al. | |
| 2007/0048594 A1 | 3/2007 | Oh et al. | |
| 2007/0148531 A1 | 6/2007 | Yoshizawa et al. | |
| 2008/0241685 A1 | 10/2008 | Hinoki et al. | |
| 2010/0086837 A1 | 4/2010 | Asari et al. | |
| 2010/0119932 A1 | 5/2010 | Nakura et al. | |
| 2010/0178543 A1 | 7/2010 | Gruner et al. | |
| 2010/0329947 A1 | 12/2010 | Fischel | |
| 2010/0330439 A1 | 12/2010 | Fischel | |
| 2010/0330445 A1 | 12/2010 | Fischel | |
| 2010/0330459 A1 | 12/2010 | Fischel | |
| 2010/0330460 A1 | 12/2010 | Fischel et al. | |
| 2011/0123866 A1 * | 5/2011 | Pan | H01M 2/16 |
| | | | 429/221 |
| 2012/0003518 A1 | 1/2012 | Fischel | |
| 2012/0077100 A1 | 3/2012 | Fischel | |
| 2012/0082873 A1 | 4/2012 | Fischel | |
| 2012/0189875 A1 | 7/2012 | Fischel et al. | |
| 2013/0017432 A1 | 1/2013 | Roumi | |
| 2013/0045413 A1 | 2/2013 | Wang et al. | |
| 2013/0224632 A1 | 8/2013 | Roumi | |
| 2014/0317920 A1 | 10/2014 | Vanderleeden et al. | |
| 2015/0104714 A1 | 4/2015 | Galande et al. | |
| 2016/0204408 A1 | 7/2016 | Herle | |
| 2016/0240326 A1 | 8/2016 | Fischel | |
| 2016/0254514 A1 | 9/2016 | Roumi | |
| 2017/0047591 A1 | 2/2017 | Fischel | |
| 2017/0062787 A1 | 3/2017 | Fischel | |
| 2017/0125829 A1 | 5/2017 | Fischel | |

OTHER PUBLICATIONS

International Search Report dated Dec. 22, 2017 for patent application PCT/US2017/051739.

International Search Report dated Feb. 22, 2018 for patent application PCT/US2017/060278.

Goodenough, J. et al., "The Li-Ion Rechargeable Battery: A Perspective", Journal of the American Chemical Society, 2013, 135 (4), pp. 1167-1176.

Gaberscek M. et al, "The Importance of Interphase Contacts in Li Ion Electrodes: The Meaning of the High-Frequency Impedance Arc", Electrochemical and Solid-State Letters,(2008), vol. 11, pp. A170-A174.

Muenzel, V. et al., "A Comparative Testing study of Commercial 18650-Format Lithium-Ion Battery Cells", Journal. ECS, (2015), vol. 162, (8) A1592-A1600.

Laurencelle, F. et al, "Characterization of a Ballard MK5-E Proton Exchange Membrane Fuel Cell Stack", Fuel Cells, 1(1) , 2001, pp. 66-71.

Kim, J., Lee S-M., Srinivasan S. and Chamberlin C.E., (1995), "Modeling of Proton Exchange Membrane Fuel Cell Performance with an Empirical Equation", Journal of the Electrochemical Society, vol. 142(8), pp. 2670-2674.

(56) References Cited

OTHER PUBLICATIONS

Koper, M., Ed., Fuel Cell Catalysis, Wiley (2009), Chapter 3, p. 70.
Newman, J., et al., "Electrochemical Systems" Wiley (2004), Chapter 22 and Table 11.1, p. 284.
Bagotsky, V.S., "Fundamentals of Electrochemistry", Wiley (2006), Chapter 4.4, pp. 60-61.
Conway, B.E., "Electrochemical Supercapacitors", Plenum (1999), Chapters 16, 17.
Gordon, M. and Suppes, G., "Convection Battery-Modeling, Insight, and Review", AIChE Journal, Aug. 18, 2013, vol. 59, No. 8, pp. 2833-2843.
Sassin, M. B. et al., "Redox Deposition of Nanoscale Metal Oxides on Carbon for Next-Generation Electrochemical Capacitors", Accounts of Chemical Research (2013), vol. 46, No. 5, pp. 1062-1074.
Chung, H. T., et al., "Active and Stable Carbon Nanotube/Nanoparticle Composite Electrocatalyst for Oxygen Reduction", Nature Communications, May 28, 2013.
Gorlin, Y., and Jaramillo, T.F., A Bifunctional Nonprecious Metal Catalyst for Oxygen Reduction and Water Oxidation, JACS Communications, Sep. 14, 2010.
Wang, H., et al., "An Ultrafast Nickel-Iron Battery from Strongly Coupled Inorganic Nanoparticle/Nanocarbon Hybrid Materials", Nature Communications, Jun. 26, 2012.
Zou, X. et al., "Cobalt Embedded Nitrogen-Rich Nanotubes Efficiently Catalyze Hydrogen Evolution Reaction at All pH Values**" Angewandte Chemie, (2014), 126, pp. 4461-4465.and Supporting Information.
Ma, X., et al., High Rate Micrometer Ordered $LiNi0.5Mn1.5O_4$, Journal of The Electrochemical Society (2010), 157(8), pp. A925-A931.
Bockris, J, O. et al, Modern Electrochemistry, 2nd Edition, Kluwer Academic/Plenum, Chapter 13.5, pp. 1812-1813. (2000).
Evanoff, K. et al., "Ultra Strong Silicon-Coated Carbon Nanotube Nonwoven Fabric as a Multifunctional Lithium-Ion Battery Anode", American Chemical Society Oct. 17, 2012, vol. 6, No. 11, pp. 9837-9845.

\* cited by examiner

GALVANIC PELLICLE REMOVABLE ATTACHMENT TOOL

CROSS-REFERENCE TO RELATED APPLICATIONS

This application is a Continuation-In-Part of U.S. patent application Ser. No. 15/069,998, which is a Divisional of U.S. patent application Ser. No. 14/717,139, now U.S. Pat. No. 9,337,474, which claims priority from Provisional Patent Application Ser. No. 62/086,836, and which is also incorporated herein by reference.

BACKGROUND

The present disclosure is directed to a tool for use in attaching a galvanic pellicle to an electrically conductive surface.

The above referenced U.S. Pat. No. 9,337,474 discloses a galvanic pellicle made of at least one of a cohesive mat of nonwoven single-walled carbon nanotubes; a cohesive mat of nonwoven multi-walled carbon nanotubes; a plurality of layers of multilayer graphene sheets; single-walled carbon nanotubes grown on woven carbon fiber; multi-walled carbon nanotubes grown on woven carbon fiber; and combinations thereof. An electrode is formed by compressing and connecting the galvanic pellicle to an electrically conductive surface by a plurality of connected areas. Additionally, any point within any uncompressed section of the galvanic pellicle is no more distant from a nearest connected area than about ten times an uncompressed thickness dimension or length of the galvanic pellicle. The uncompressed thickness length of the galvanic pellicle may be between about 1 micrometer and about 1 millimeter. (For purposes herein the word "about" is to mean plus or minus ten percent.)

The electrode made of the described galvanic pellicle and electrically conductive surface achieve extraordinarily reduced resistance to electron movement between the pellicle and the electrically conductive surface by having the connected areas of the galvanic pellicle and the electrically conductive surface compressed together by a pressure exceeding about 6,894.00 Newtons per square centimeter.

Additionally, connected areas of the galvanic pellicle compressed against the electrically conductive surface of the described electrode need to be as close as between about 20 micrometer ("μm") and about 20 millimeters ("mm") apart. Moreover, to produce an efficient electrode, many such connected areas must be formed between the galvanic pellicle and the electrically conductive surface.

SUMMARY

In accordance with the present disclosure, there is provided a removable attachment tool for attaching a galvanic pellicle to an electrically conductive surface. The removable attachment tool comprises a base having a contact surface and an opposed projection surface, wherein the base includes at least first and second woven, planar, rigid, metallic compression screens. The first and second compression screens are secured to each other so that windows defined by the metallic compression screens are aligned to overlie each other, meaning the windows are in registry with each other. Extending connection surfaces of the at least first metallic compression screen are secured to extending connection surfaces of the at least second metallic compression screen to form cross-over intersections. A plurality of linear projections extends from the cross-over intersections in a direction perpendicular to and away from the projection surface of the base so that no projection contacts another projection.

In another and alternative embodiment of the removable attachment tool, all of the projections extend a same predetermined distance away from the projection surface of the base.

In another and alternative embodiment, all of the projections extend away from the projection surface of the base so that all of the linear projections are equidistant from each other.

In another and alternative embodiment, each linear projection includes an attachment end farthest from the base, and each attachment end includes one of a brazing filler material and a soldering filler material.

In another and alternative embodiment, a shortest distance between adjacent linear projections is between about 20 μm and about 20 mm.

In another and alternative embodiment, each linear projection is formed of a plurality of stacked, severed cross-over intersections. The severed cross-over intersections are severed from a corresponding plurality of woven, planar, rigid, metallic compression screens secured to extending connection surfaces of the base and secured to extending connection surfaces of each adjacent compression screen. The plurality of stacked, severed cross-over intersections are severed out of the plurality of compression screens so that only the plurality of stacked, severed cross-over intersections remain secured to the base.

In another and alternative embodiment the extending connection surfaces of the at least first metallic compression screen are sintered to extending connection surfaces of the at least second metallic compression screen.

This disclosure also includes a method of making the removable attachment tool for attaching a galvanic pellicle to an electrically conductive surface. The method comprises forming a stack of at least three woven, planar, rigid, metallic compression screens and securing the screens to each other so that a first and an adjacent second metallic compression screen define a base of the attachment tool. The base defines a contact surface adjacent a projection surface of the base. The at least third metallic compression screen is aligned adjacent the projection surface of the base. The method also includes positioning windows defined by the metallic compression screens to overlie each other and forming cross-over intersections of the metallic compression screens by securing extending connection surfaces of each metallic compression screen to extending connection surfaces of an adjacent metallic compression screen. The method finally includes, then forming a plurality of projections extending from the cross-over intersections of the second metallic compression screen by severing out of the at least third metallic compression screen portions of the screen extending between the cross-over intersections of the third metallic compression screen.

In another alternative method, the disclosure also includes sintering the extending connection surfaces of each metallic compression screen to extending connection surfaces of an adjacent metallic compression screen.

In a further alternative method, the disclosure also includes severing out of the at least third metallic compression screen portions of the screen extending between the cross-over intersections of the at least third metallic compression screen by making two orthogonal passes by micro-cutters in a NC mill.

Other details of the removable galvanic pellicle attachment tool are set forth in the following detailed description and the accompanying drawings wherein like reference numerals depict like elements.

DETAILED DESCRIPTION

Figure 1:
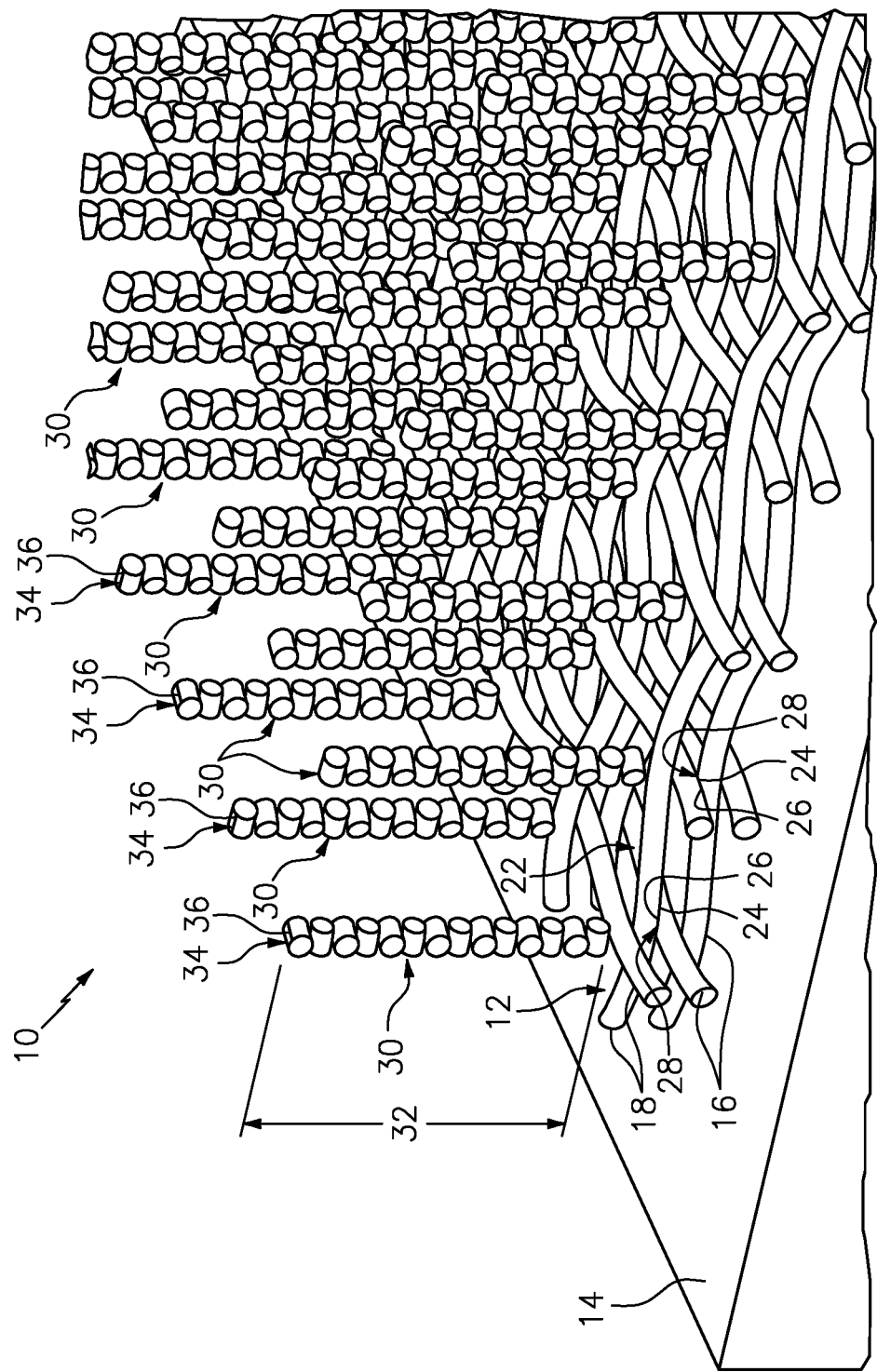
FIG. 1 is raised, perspective, fragmentary view of a removable galvanic pellicle attachment tool.
Figure 2:
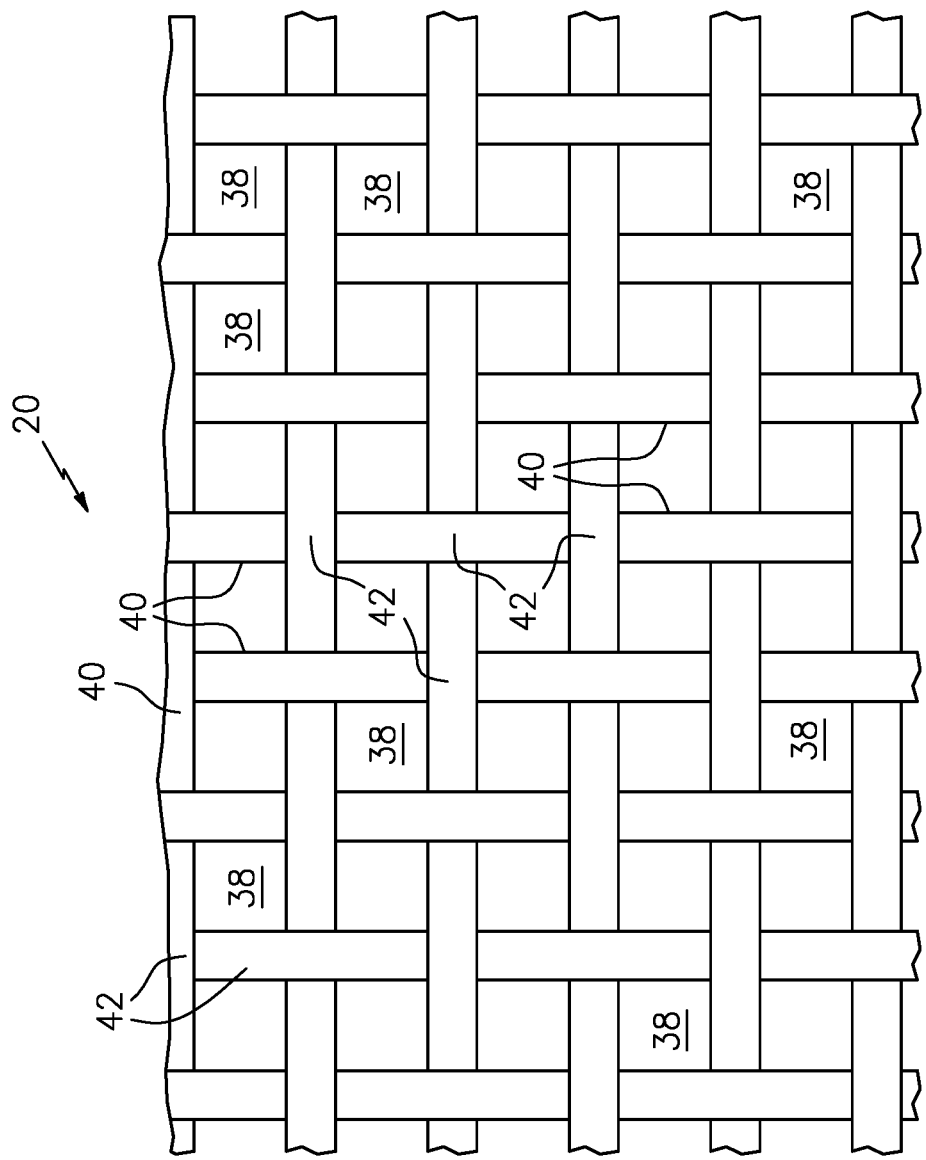
FIG. 2 is a top plan, fragmentary view of a woven, planar, rigid, metallic compression screen.

Referring now to FIG. 1, a removable attachment tool for attaching a galvanic pellicle to an electrically conductive surface is shown in side perspective view and is generally designated by the reference numeral 10. The removable attachment tool 10 includes a base 12 shown in FIG. 1 resting upon a support surface 14. The base 12 has a contact surface 16 made of a first woven, planar, rigid, metallic compression screen 16. A projection surface 18 of the base 12 that is opposed to the contact surface 16 of the base 12, is made of a second woven, planar, rigid, metallic compression screen 18. The contact surface 16 rests upon the support surface 14 and forms a bottom of the attachment tool 10. FIG. 2 shows a top view a single, non-stacked, woven, planar, rigid metallic compression screen 20 in isolation for purposes of clearly showing that the woven screens 16, 18 and 20 have non-planar exterior surfaces.

The first and second compression screens 16, 18 are secured to each other so that windows 22 defined by the woven compression screens 16, 18 are aligned to overlie each other. (Describing the windows 22 as being "aligned to overlie each other" is synonymous with saying the "windows are in window registry".) The screens 16, 18 are secured to each other by having extending connection surfaces 24 of the first metallic, woven compression screen 16 secured to extending connection surfaces 26 of the second metallic compression screen 18. Securing the adjacent extending connection surfaces 24, 26 also forms cross-over intersections 28.

As shown in FIG. 1, a plurality of linear projections 30 extends from the cross-over intersections 28 in a direction perpendicular to and away from the projection surface 18 of the base 12 so that no projection 30 contacts another projection 30. FIG. 1 also shows that all of the projections 30 may extend a same predetermined distance 32 away from the projection surface 18 of the base 12, and that all of the linear projections 30 may also be equidistant from each other.

FIG. 1 also shows that each linear projection 30 includes an attachment end 34 farthest from the base 12. Each attachment end 34 may include one of a brazing filler material and a soldering filler material 36.

FIG. 2, as stated above, shows a top plan view of a woven, planar, rigid, metallic compression screen 20 that also defines a plurality of windows 38 defined by intersecting strands 40 of the compression screen 20. FIG. 2 also shows that, because the screen 20 is woven, certain sections of the strands 40 necessarily form extending connection surfaces 42 wherein one strand 40 passes over another strand 40 of the screen. When screens, such as the contact surface screen 16 and the projection surface screen 18 are stacked in window registry, as shown in FIG. 1, the extending connection surfaces 24, 26 of the respective, adjacent screens 16, 18 contact each other, while other portions of the strands of the screens 16, 18 do not contact each other. The contacting extending connection surfaces 24, 26 are secured to each other.

The contacting extending connection surfaces 24, 26 may be secured by any securing means for keeping the screens 16, 18 in unmoving contact with each other, such as by adhesives, mechanical securing apparatus, brazing, soldering, any known bonding, or by heating of the contacting, overlying screens to a sintering temperature, to sinter the contact surface screen 16 to the projection surface screen 18. (For purposes herein, the phrase "sintering the contact surface screen 16 to the projection surface screen 18" is to mean that metallic screens are heated to a temperature below a melting temperature, but high enough to produce limited inter-diffusion between adjacent, contacting screen materials at exterior surfaces of the extending connection surfaces 24, 26 that, upon cooling, forms a bond sufficient to secure the screens 16, 18 to each other.

Figure 3:
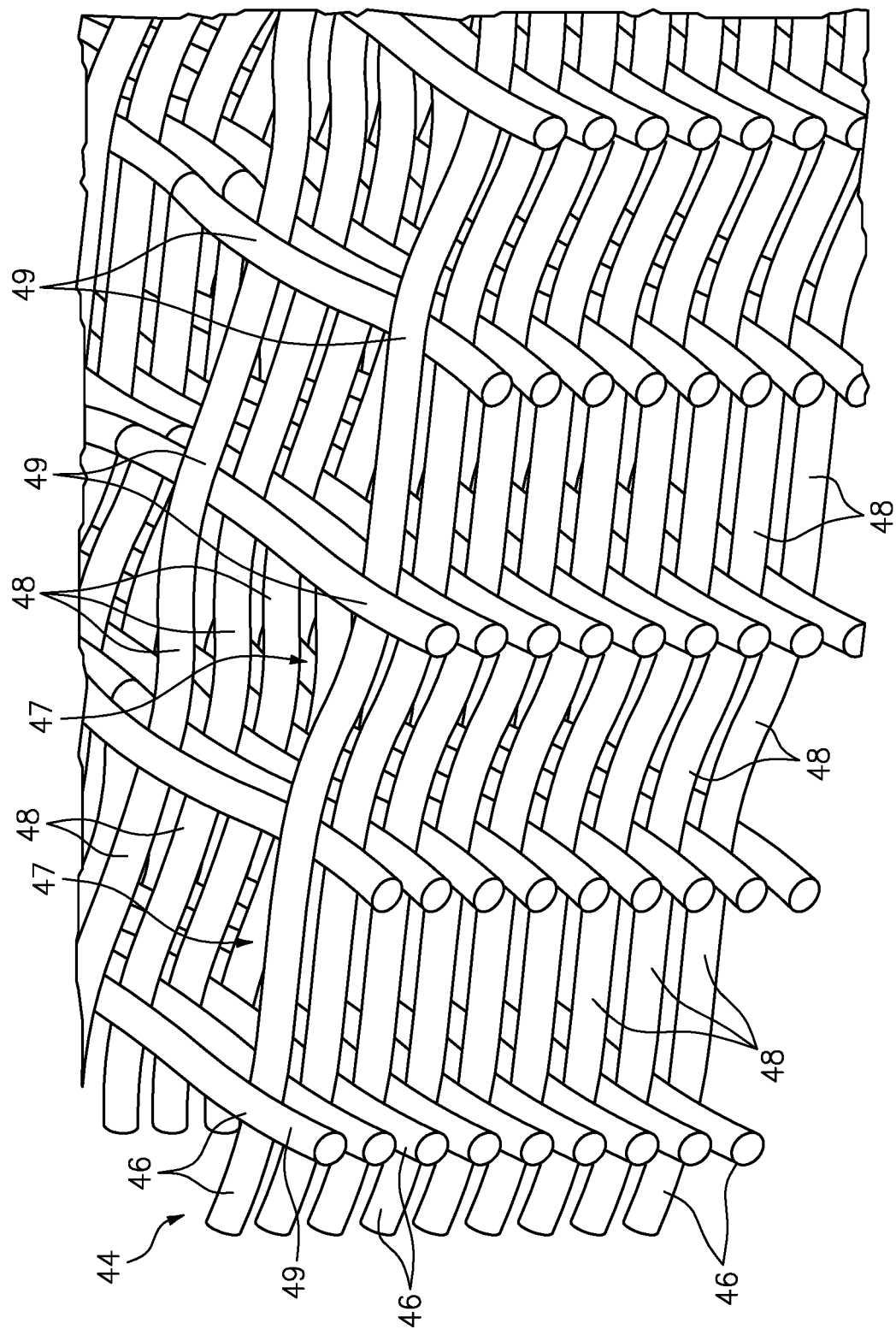
FIG. 3 is a raised, perspective, fragmentary view of a stack of woven, planar, rigid, metallic compression screens showing each screen defining windows and showing the screens stacked so that the windows overlie each other, or are said to be stacked in window registry.

FIG. 3 shows a stack 44 of woven, planar, rigid, metallic compression screens 46 stacked in window registry so that widows 47 defined by the screens overlie each other. Interconnecting portions 48 of the screens 46 extend between cross-over intersections 49 of the screens 46.

Figure 4:
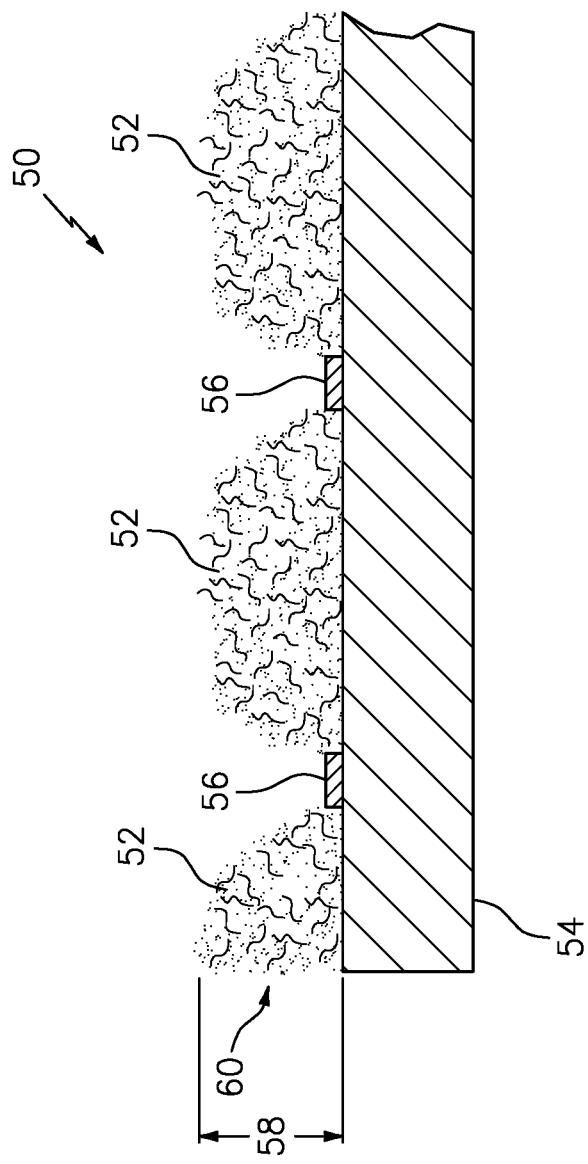
FIG. 4 is a fragmentary cross-sectional side view of an electrode made of a galvanic pellicle having uncompressed sections and also having compressed sections secured to a conductive surface at two connected areas.

FIG. 4 shows a fragmentary, cross-sectional side view of an electrode 50 made of a galvanic pellicle 52 that is secured to an electrically conductive surface 54 by a plurality of connected areas 56. FIG. 4 also shows a length dimension 58 of an uncompressed portion 60 of the galvanic pellicle 52. In preferred embodiments of the electrode 50, the length dimension 58 of the uncompressed portion 60 of the galvanic pellicle may be between about 1.0 µm and about 1.0 mm. (For purposes herein the word "about" is to mean plus or minus ten percent.)

In an alternative embodiment of the removable galvanic pellicle attachment tool 10, a shortest distance between adjacent linear projections 30 is between about 20 µm and about 20 mm.

In another and alternative embodiment of the removable galvanic pellicle attachment tool 10, each linear projection 30 is formed of a plurality of stacked, severed cross-over intersections 28. The severed cross-over intersections 28 are severed from a corresponding plurality of woven, planar, rigid, metallic compression screens (shown as a stack 44 of screens in FIG. 3) that are secured to extending connection surfaces (shown at 24, 26 in FIG. 1) of the base 12 and secured to extending connection 24, 26 surfaces of each adjacent compression screen 18. The plurality of stacked, severed cross-over intersections 28 are severed out of the plurality of stacked compression screens 44 (of FIG. 3) so that only the plurality of stacked, severed cross-over intersection projections 30 (of FIG. 1) remain secured to the base 12.

This disclosure also includes a method of making the removable attachment tool 10 for attaching a galvanic pellicle 52 to an electrically conductive surface 54. The method comprises forming a stack 44 of at least three woven, planar, rigid, metallic compression screens 46 and securing the screens 46 to each other so that a first 16 (FIG. 1) and an adjacent second metallic compression screen 18 define a base 12 of the attachment tool 10. The base 12 defines a contact surface screen 16 adjacent a projection surface screen 18 of the base 12. The at least third metallic compression screen (shown in FIG. 3 at 46) is aligned adjacent the projection surface screen 18 of the base 12. The method also includes positioning windows 22 defined by the metallic compression screens 16, 18 to overlie each other 22 and forming cross-over intersections 28 of the metallic compression screens 16, 18 by securing extending connection surfaces 24 of a metallic compression screen 16 to the extending connection surfaces 26 of an adjacent metallic compression screen 18. The method finally includes, next forming a plurality of projections 30 extending from the cross-over intersections 28 of the second metallic compression screen 18 or projection surface screen 18 by severing out of the at least third metallic compression screen 46 (of FIG. 3) interconnecting portions 48 extending between the cross-over intersections 49.

The disclosure also includes severing out the interconnecting portions 48 of the screen that extend between the cross-over intersections 49 by making two orthogonal passes by micro-cutters in a NC mill (not shown).

The described woven, planar, rigid, metallic screens 16, 18, 20, 46 may be made of stainless steel, inconel, hard tool steel, copper, aluminum, alloys and the like.

An exemplary use of the galvanic pellicle 52 removable attachment tool 10 includes forcing the tool 10 upon an uncompressed galvanic pellicle 52 so that the projections 30 compress and bond connected areas 56 of the pellicle to and/or into the conductive surface 54, as shown in FIG. 4. The projections 30 may include a brazing or soldering filler material 56 at attachment ends 34 of the projections 30. When compressed into the pellicle 52, the projections 30, or their attachment ends 34, may be heated to melt the brazing or soldering filler material 56 to then form the connected areas 56 with compressed portions of the galvanic pellicle 52 bonded within the filler material 56 to become integral with the connected areas 56. Alternatively, the electrically conductive surface 54 may be coated or "tinned" with a heat-sensitive bonding material, such as a brazing or soldering filler material. Then, the projections 30 of the tool 10 may be forced into the galvanic pellicle 52 to compress the pellicle 52. The projections 30, by heating or pressure alone, may melt the bonding material on the conductive surface 54 to bond the compressed galvanic pellicle 52 to become integral with the connected area 56.

There has been provided a galvanic pellicle removable attachment tool 10. While the galvanic pellicle removable attachment tool 10 has been described in the context of specific described and illustrated embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A removable attachment tool for attaching a galvanic pellicle to an electrically conductive surface, the removable attachment tool comprising:
a base having a contact surface and an opposed projection surface, wherein the base includes at least first and second woven, planar, rigid, metallic compression screens, the first and second compression screens secured to each other so that windows defined by the metallic compression screens are aligned to overlie each other, wherein extending connection surfaces of the at least first metallic compression screen are secured to extending connection surfaces of the at least second metallic compression screen to form cross-over intersections; and,
a plurality of linear projections extending from the cross-over intersections in a direction perpendicular to and away from the projection surface of the base, and wherein no projection contacts another projection.

2. The removable attachment tool of claim 1, wherein all of the projections extend a same predetermined distance away from the projection surface of the base.

3. The removable attachment tool of claim 1, wherein all of the projections extend away from the projection surface of the base so that all of the projections are equidistant from each other.

4. The removable attachment tool of claim 1 wherein each linear projection includes an attachment end farthest from the base, and wherein each attachment end includes one of a brazing filler material and a soldering filler material.

5. The removable attachment tool of claim 1, wherein a shortest distance between adjacent linear projections is between about 20.0 μm and about 20.0 mm.

6. The removable attachment tool of claim 1, wherein each projection is formed of a plurality of stacked, severed cross-over intersections, wherein the severed cross-over intersections are severed from a corresponding plurality of woven, planar, rigid, metallic compression screens secured to extending connection surfaces of the base and secured to extending connection surfaces of each adjacent compression screen, the plurality of stacked, severed cross-over intersections being severed out of the plurality of compression screens so that only the plurality of stacked, severed cross-over intersections remain secured to the base.

7. The removable attachment tool of claim 1, wherein the extending connection surfaces of the at least first metallic compression screen are sintered to extending connection surfaces of the at least second metallic compression screen.

8. A method of making the removable attachment tool for attaching a galvanic pellicle to an electrically conductive surface of claim 1, the method comprising:
forming a stack of at least three woven, planar, rigid, metallic compression screens secured to each other so that a first and an adjacent second metallic compression screen define a base of the attachment tool, the base defining a contact surface adjacent a projection surface of the base, and the at least third metallic compression screen aligned adjacent the projection surface of the base;
positioning windows defined by the metallic compression screens to overlie each other;
forming cross-over intersections of the metallic compression screens by securing extending connection surfaces of each metallic compression screen to extending connection surfaces of an adjacent metallic compression screen;
then, severing out interconnecting portions extending between the cross-over intersections of the at least third metallic compression screen to form a plurality of projections extending from the cross-over intersections of the second metallic compression screen.

9. The method of making the removable attachment tool of claim 8, wherein the step of securing extending connection surfaces of each metallic compression screen to extending connection surfaces of an adjacent metallic compression screen further comprises sintering the extending connection surfaces of each metallic compression screen to extending connection surfaces of an adjacent metallic compression screen.

10. The method of making the removable attachment tool of claim 8, wherein the step of severing out interconnecting portions extending between the cross-over intersections of the at least third metallic compression screen further comprises making two orthogonal passes by micro-cutters in a NC mill.

* * * * *